United States Patent [19]

Sayer

[11] Patent Number: 4,740,150

[45] Date of Patent: Apr. 26, 1988

[54] INJECTION MOULDING APPARATUS
[75] Inventor: Matthew E. Sayer, Tamworth, England
[73] Assignee: Peerless Cinpres Limited, Staffordshire, England
[21] Appl. No.: 48,862
[22] Filed: May 12, 1987
[30] Foreign Application Priority Data Mar. 16, 1987 [GB] United Kingdom ............... 8706204

[51] Int. Cl.$^4$ .......................................... B29C 45/00
[52] U.S. Cl. .................................. 425/542; 264/513; 264/572; 425/557; 425/559; 425/562; 425/573
[58] Field of Search ............... 425/130, 131.1, 557, 425/559, 562, 564, 573, 542; 264/513, 45.1, 572

[56] References Cited

U.S. PATENT DOCUMENTS

| 4,129,635 | 12/1978 | Yasuike et al. | 264/45.5 |
|---|---|---|---|
| 4,136,220 | 1/1979 | Olabisi | 428/35 |
| 4,247,515 | 1/1981 | Olabisi | 264/45.5 |
| 4,397,806 | 8/1983 | Hettinga | 425/558 |
| 4,474,717 | 10/1984 | Hendry | 264/45.5 |
| 4,555,225 | 11/1985 | Hendry | 425/4 R |

FOREIGN PATENT DOCUMENTS

| 127961 | 12/1984 | European Pat. Off. |
| 2106546 | 8/1972 | Fed. Rep. of Germany . |
| 2256021 | 12/1974 | France . |
| 14968 | 3/1982 | Japan . |
| 603072 | 6/1948 | United Kingdom . |
| 619288 | 4/1949 | United Kingdom . |
| 945234 | 12/1963 | United Kingdom . |
| 996186 | 6/1965 | United Kingdom . |
| 1076047 | 7/1967 | United Kingdom . |
| 1106567 | 3/1968 | United Kingdom . |
| 1167513 | 10/1969 | United Kingdom . |
| 1318030 | 5/1973 | United Kingdom . |
| 1339445 | 5/1973 | United Kingdom . |
| 1460101 | 12/1976 | United Kingdom . |
| 1487187 | 9/1977 | United Kingdom . |
| 2039215 | 8/1980 | United Kingdom . |
| 2139548 | 11/1984 | United Kingdom . |
| 2158002 | 11/1985 | United Kingdom . |

OTHER PUBLICATIONS

"Gas Injection Relieves Moulding Stress"; Eureka Transfers Technology, Jun. 1985, p. 31.
"Moulding System with Body Appeal" (undated).
"Gas-Cored Injection Techniques Go into Production"; Plastics Machinery and Equipment, Nov. 1985.
Cinpress Brochures, "Controlled Internal Pressure Process" & Cost Savings with Cinpress, presented at Plastics Show, England-Sep. 1985.
"Process Molds Rigid, Smooth Parts That Are 'Strees Free'"; Modern Plastics, Nov. 1985, p. 26.
"Advanced Injection Moulding Process"; European Plastics News, Jun. 1985.
"Plastics After Deal Clinched"; John Baker (undated).
"Plastics Moulding Process Gives More Design Freedom"; Oem Design, Jun. 1985.
"Swirl-Free Foam Parts"; Plastics Technology, May 1976, pp. 33-36.
"Through-the-Nozzle Gas Injection Produces Class-A Foam Parts"; Modern Plastics, Mar. 1980, pp. 22-24.
"The Best of Two Worlds in Plastics Processing"; Machine Design, Dec. 9, 1982, pp. 99-102.
"New Automotive PP, HDPE Applications Tested in Europe"; Plastics Technology, Nov. 1985, p. 106.

Primary Examiner—Jay H. Woo
Assistant Examiner—Timothy W. Heitbrink
Attorney, Agent, or Firm—Beveridge, DeGrandi & Weilacher

[57] ABSTRACT

Apparatus for producing an injection moulding of plastics material comprises means for introducing a supply of plastics material, passage means for communicating the supply means to a mould space, and means for introducing a pressurized gas into the plastics material filling the mould space whereby the gas creates a gas containing cavity in the plastics material and for thereafter relieving the gas pressure within the gas containing cavity before the mould is opened. The gas supply/pressure relieving means comprise valve means including a valve port opening directly into the mould space, for opening the gas filled cavity to the atmosphere, a valve member for closing the port, and means to supply pressurized gas to the mould while the valve member is in the port closing position to create the cavity and to maintain the valve port open to the cavity whereby, after a moulding operation has been finished, the supply of pressurized gas can be terminated and pressurized gas in the cavity in the moulding can be vented to atmosphere by opening the valve member.

9 Claims, 3 Drawing Sheets

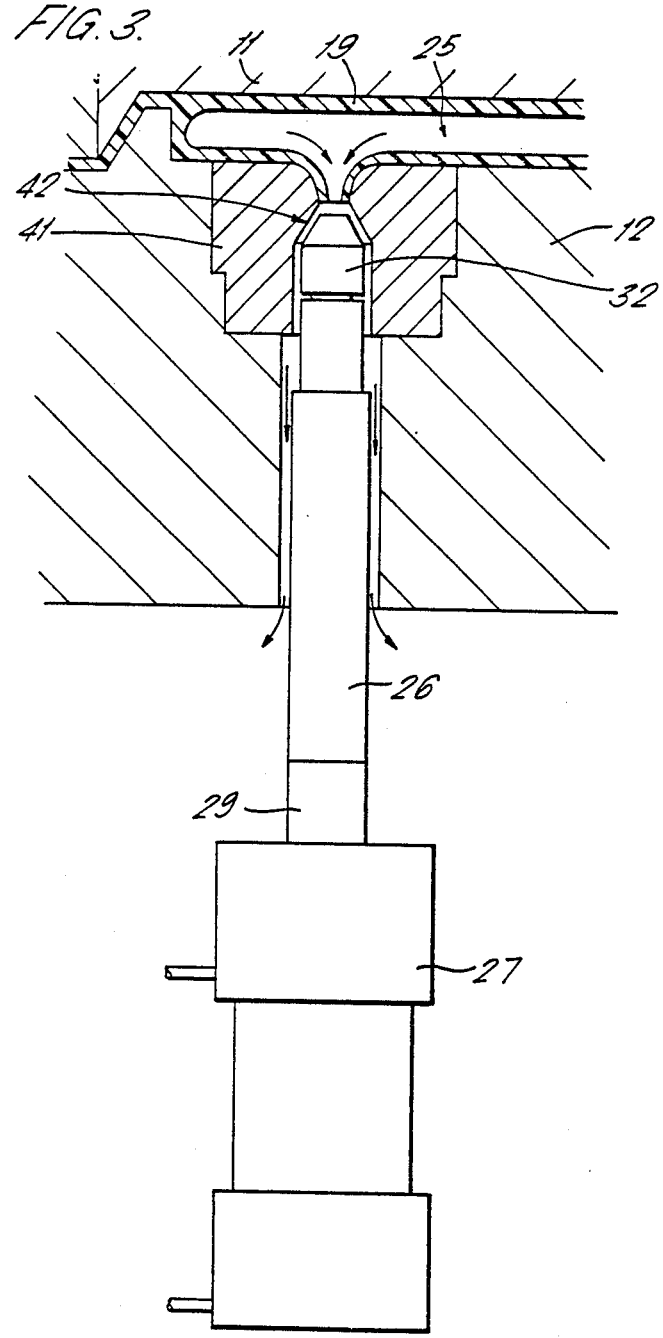

4,740,150

INJECTION MOULDING APPARATUS

BACKGROUND OF THE INVENTION

1. Field of the Invention

This invention relates to injection moulding apparatus.

2. Prior Art

British Patent Specification No. 2139548 describes a process of producing an injection moulding comprising introducing plastics material into a mould space and at one or more selected positions separately introducing a pressurized gas into the stream of plastics material filling the mould to create a gas containing cavity in the plastics material, maintaining the pressurization in the gas and utilising the pressurized gas in the plastics material to cause the plastics material to flow throughout the mould space with the gas containing cavity within the plastics material, the cavity thereby extending with the plastics material, and when the plastics material has extended over the whole of the mould space, continuing to maintain the gas pressure within the gas containing cavity to hold the plastics material positively against the mould surface as the plastics material solidifies and cools until the moulding can itself sustain the form dictated by the mould surface.

In one embodiment described the pressurized gas is introduced at a position within the mould space, and in an alternative embodiment the gas is introduced upstream of the mould space adjacent the outlet end of a screw ram for introducing the plastics material. In each case the gas is introduced through a passageway subsequently to the outlet end of the passageway being immersed in the plastics material, the gas entering the plastics material and forming the gas containing cavity therein.

At the end of the moulding cycle, the gas pressure within the gas containing cavity is relieved before the mould is opened. In each embodiment described in British Patent Specification No. 2139548, a valve is opened to allow the gas to flow back through the passageway through which it was introduced to create the cavity, the gas emitted conveniently passing to atmosphere. This arrangement works well in the embodiment of Specification No. 2139548 in which the outlet end of the passageway is positioned upstream of the mould space and the passageway is relatively short.

However, in the case of the embodiment in Specification No. 2139548 in which the outlet end of the passageway is positioned within the mould space, it has been found to be more difficult to evacuate the cavity sufficiently. There is also a tendency for the outlet end of the passageway to become blocked by plastics material which must first immerse the outlet end of the passageway before gas is introduced and whilst the plastics material is still molten.

For the production of some mouldings, especially mouldings of complex design, it is desirable to introduce the pressurized gas at one or more selected positions either within the mould space alone or both within the mould space and upstream of the mould space, and subsequently to evacuate the gas from the moulding at each position. Such a situation may arise, for example, when it is desired to employ a hot runner system or the choice of gate position is restricted by the desire to avoid excess use of gas ribs. The present invention makes it possible to introduce the gas at any selected position without the aforesaid disadvantages.

SUMMARY

According to the invention there is provided an apparatus for producing an injection moulding of plastics material comprising means for introducing a supply of plastics material, passage means for communicating the supply means to a mould space, and means for introducing a pressurized gas into the plastics material filling the mould space whereby the gas creates a gas containing cavity in the plastics material and for thereafter relieving the gas pressure within the gas containing cavity before the mould is opened, wherein said gas supply/pressure relieving means comprise valve means including a valve port opening directly into the mould space, for opening the gas filled cavity to the atmosphere, a valve member for closing the port, and means to supply pressurised gas to the mould whilst the valve member is in the port closing position to create the cavity and to maintain the valve port open to the cavity whereby, after a moulding operation has been finished, the supply of pressurized gas can be terminated and gas in the cavity in the moulding can be vented to atmosphere by opening the valve member.

Preferably said gas supply/pressure relieving means comprise a first passageway through which the pressurised gas enters the plastics material and a separate second passageway through which the pressurized gas evacuates the cavity to atmosphere, sadi passageways converging at the valve means.

It is also preferred that the outlet end of the first passageway incorporates a non-return valve whereby neither plastics material nor the evacuated gas can pass back through the first passageway. The first passageway is preferably a bore in the valve member. In this case the leading end of the valve member is preferably a separately constructed cap which houses the non-return valve.

Preferably the second passageway contains the valve member whereby when the valve member is opened the evacuated gas passes around the valve member into the second passageway and thereby to atmosphere.

The valve member is preferably connected to the piston of a piston and cylinder for moving the valve member between its closed and open positions.

The means for supplying the plastics material may be associated with valve means, e.g. a slide valve, for closing off the supply means when the required amount of plastics material has been supplied.

BRIEF DESCRIPTION OF THE DRAWINGS

FIG. 3 is a similar view to FIG. 2, in elevation, the gas injection nozzle being in its withdrawn position after the moulding operation has been finished.

DESCRIPTION OF THE PREFERRED EMBODIMENT

Figure 1:
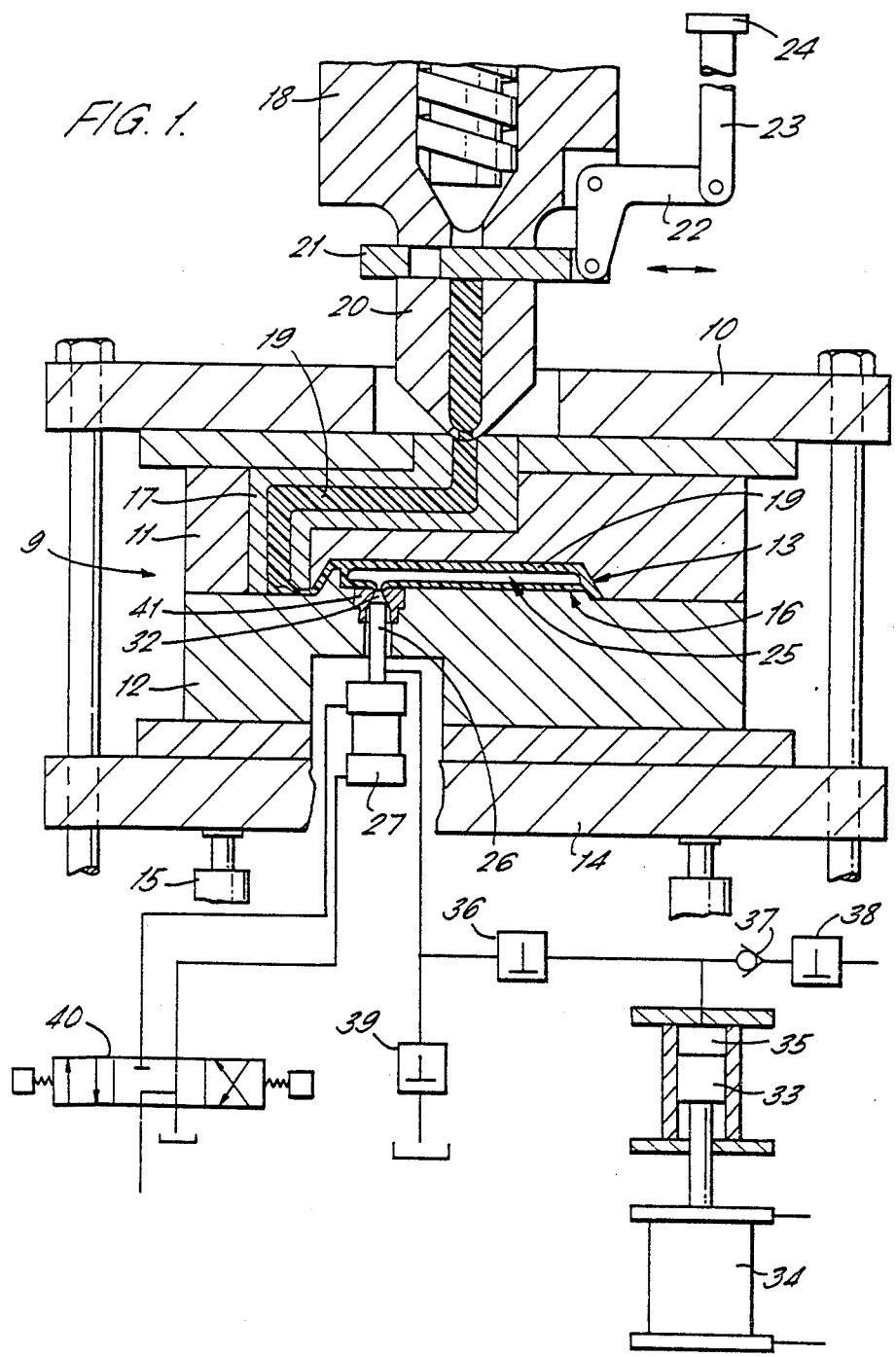
FIG. 1 show, by way of example, an injection moulding machine.

This example concerns an apparatus for producing injection mouldings of plastics material which is based on the apparatus described in British Patent Specification No. 2139548. In that apparatus there is provided a screw ram for introducing plastics material into a mould space, and a passageway through which pressurized gas is introduced under controlled conditions to create a gas containing cavity in the plastics material. A piston and cylinder arrangement maintains the pressurization in the gas whereby the pressurized gas in the plastics material causes the plastics material to flow throughout the mould space with the gas containing cavity within the plastics material, the cavity thereby extending with the plastics material. The same piston and cylinder is also used to maintain the gas pressure within the gas containing cavity when the plastics material has extended over the whole of the mould space, to hold the plastics material positively against the mould surface as the plastics material solidifies and cools until the moulding can itself sustain the form dictated by the mould surface. Valve means are then opened for relieving the gas pressure within the gas containing cavity before the mould is opened.

The position for introducing the pressurized gas may be at one or more selected positions either within the mould space or upstream of the mould space. In each position, the gas is introduced through the respective passageway, and likewise emitted from the gas containing cavity through the same passageway at the end of the moulding cycle.

With reference to the drawings, a mould 9 of an injection moulding machine has upper and lower parts 11, 12 defining a mould space 13 of complex design and incorporating a rib 16. The mould parts 11, 12 are mounted between a fixed upper platen 10 and a lower platen 14 movable by a hydraulic ram 15. Also, in this embodiment, within the upper mould part 11 is a hot runner manifold 17 comprising passage means leading to a desired point of entry to the mould space 13.

A screw ram 18 is provided for introducing molten thermoplastics material 19 through a nozzle assembly 20 to the hot runner manifold 17 and hence to the mould space 13. The nozzle assembly is provided with a shut-off slide valve 21 actuated by a bell-crank lever 22 and a link 23 connected to a hydraulic cylinder 24. The valve 21 is shown in its closed position at the end of the moulding cycle which includes the introduction of the plastics material. The closed valve 21 prevents any return movement of the plastics material to the barrel of the screw ram 18. The screw ram may then be refilled with plastics material in preparation for the next moulding cycle.

The passageway through which pressurized gas is introduced to create a gas containing cavity 25 in the plastics material 19 is the bore 28 of a retractable nozzle or valve member 26 connected to the piston 29 of a hydraulic or pneumatic cylinder 27. At the downstream end of the nozzle 26 is a non-return valve 30 (FIG. 2) comprising a ball 31 held captive by a screw-on cap 32. Pressurized gas is supplied to the upstream end of the nozzle 26 from a chamber 35 by a piston and cylinder 33, 34, the chamber 35 holding the measured amount of gas, e.g. nitrogen, which it is required to introduce into the plastics material. As described in Specification No. 2139548, the chamber 35 is connected to the nozzle 26 via a solenoid operated valve 36, and to a gas supply (not shown) via a non-return valve 37 and a pressure regulator 38. Downstream of the valve 36, the connection has a feed to waste via another solenoid operated valve 39.

The piston and cylinder 29, 27 is controlled via a solenoid operated valve 40 by control means (not shown) to move the nozzle 26 between a forward position (FIG. 2) and a withdrawn position (FIG. 3). In the forward position, the cap 32 of the nozzle is in the sealing engagement with a conical valve seat of a valve port 42 provided, in this embodiment, by an insert 41 in the lower mould part 12, the pressure applied by the piston 29 being greater than the pressure applied by the plastics material within the mould space 13 and the back pressure of the gas which is creating the gas containing cavity 25. In the withdrawn position of the nozzle 26, gas from the cavity readily passes through the valve port 42 around the nozzle 26 to atmosphere, the ball 31 of the non-return valve 30 preventing the gas returning back along the bore of the nozzle.

Figure 2:
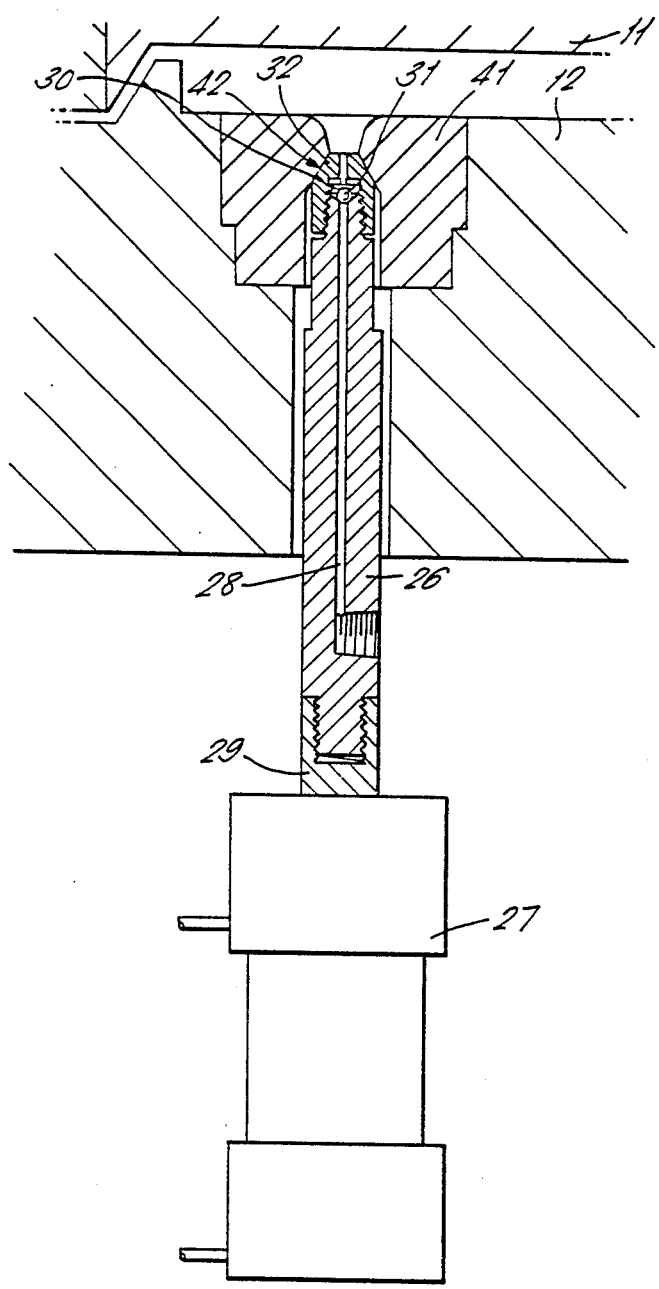
FIG. 2 is a detail sectional view of the retractable gas injection nozzle of the injection moulding machine of FIG. 1, the nozzle being in its foward position prior to the introduction of plastics material.

In general terms the process of injection moulding is the same as described in detail in British Patent Specification No. 2139548. It is thus sufficient to explain that at the start of the moulding cycle the nozzle or valve member 26 is held forward under pressure by the piston and cylinder 29, 27 thereby closing the valve port 42 (FIG. 2). The screw ran 18 contains plastics material and the slide valve 21 is open. The chamber 35 is also filled with the measured quantity of pressurised gas, and the valves 36 and 39 are both closed.

Operation of the screw ram 18 introduces the plastics material into the mould space via the hot runner manifold. Simultaneously a gas delay timer is started. At the end of this delay time, the outlet end of the nozzle 26 is immersed in plastics material. The valve 36 is then opened and the piston and cylinder 33, 34 is operated to introduce gas through the nozzle 26 into the plastics material to create a gas containing cavity in the plastics material. The pressurization in the gas is maintained by the piston and cylinder 33, 34 whereby the gas in the plastics material causes the plastics material to flow throughout the mould space with the gas containing cavity within the plastics material, the cavity thereby extending with the plastics material until the plastics material has extended over the whole of the mould space. When the desired amount of plastics material has been introduced into the mould the slide valve 21 is closed and the screw ram refilled with plastics material. Meanwhile the supply of pressurized gas is terminated, but the piston 33 remains at the forward end of its stroke to maintain the gas pressure within the gas containing cavity to hold the plastics material in the mould positively against the mould surface as the plastics material solidifies and cools until the moulding can itself sustain the form dictated by the mould surface.

The valve 36 is closed and the piston 33 withdrawn. The cylinder 34 is then refilled with another measured quantity of gas under pressure. The valve 39 is also opened and the gas downstream of the valve 36 in the connection to the nozzle 26 passes to waste.

Furthermore, the valve 40 is reversed so that the piston 29 withdraws the nozzle 26 and the gas in the gas containing cavity passes through the valve port 42 to atmosphere (FIG. 3) thereby relieving the gas pressure in the cavity. The mould 10 is then opened and the moulding removed. Finally the piston and cylinder 29 is operated to return the nozzle 26 to its forward position (FIG. 2) to await the introduction of plastics material during the next moulding cycle.

The invention is not restricted to the details of the specific example described above. For example, the screw ram or other conventional means for introducing the plastics material may be associated with a sprue instead of a hot runner manifold.

If desired, the outlet end of the nozzle 26 may protrude into the flow of plastics material within the mould space rather than be disposed wholly in the lower mould part 12.

Furthermore, the retractable gas injection nozzle 5 may also be used alone either within the mould space, as in the embodiment described, or upstream of the mould space, or in a number of selected positions giving several gas injection points, or in association with a fixed gas injection system which is described in British Patent Specification No. 2139548. Moreover, in a modified embodiment the retractable gas injection nozzle of the present invention may replace the fixed nozzle of FIG. 5 of British Patent Specification No. 2139548. In this case, it has been found that the provision of the slide valve 21 not only allows the screw ram to be refilled in advance of the succeeding moulding cycle but also positively precludes any tendency for the gas to enter the screw ram as well as preventing any back movement of the plastics material into the screw ram.

We claim:

1. Apparatus for producing an injection moulding of plastics material comprising means for introducing a supply of plastics material, passage means for communicating the supply means to a first opening in a mould space, and means for introducing a pressurized gas through a second opening in the mould space into the plastics material filling the mould space whereby the gas creates a gas containing cavity in the plastics material and for thereafter relieving the gas pressure within the gas containing cavity before the mould is opened, said gas supply/pressure relieving means comprising at said second opening a valve port opening directly into the mould space, a valve member for closing the valve port, and means to supply pressurized gas to the mould space through the valve member whilst the valve member is in a valve port closed position to create the cavity and after a moulding operation has been finished, the supply of pressurized gas can be terminated and pressurized gas in the cavity in the moulding can be vented to the atmosphere due to movement of the valve member to a valve port open position.

2. Apparatus as claimed in claim 1, wherein said gas supply/pressure relieving means comprise a first passageway in said valve member through which the pressurized gas enters the plastic material and after a moulding operation has been finished, the supply of pressurized gas can be terminated and pressurized gas in the cavity in the moulding can be vented through a second passageway to the atmosphere due to movement of the valve member to a valve port open position, said first and secon passageways converging at the valve port.

3. Apparatus as claimed in claim 2, wherein a non-return valve is situated in an outlet end of the first passageway such that neither plastics material nor pressurised gas can pass back through the first passageway.

4. Apparatus as claimed in claim 3, wherein the outlet end of the valve member is a separately constructed cap which houses the non-return valve.

5. Apparatus as claimed in claim 2 wherein the second passageway contains the valve member whereby when the valve member is opened the pressurized gas passes around the valve member into the second passageway and thereby to the atmosphere.

6. Apparatus as claimed in claim 1, wherein the valve member is connected to the piston of a piston and cylinder for moving the valve member between its valve port closed and valve port open positions.

7. Apparatus as claimed in claim 1, wherein the means for supplying the plastics material is associated with valve means for closing off the supply means when the required amount of plastics material has been supplied.

8. Apparatus as claimed in claim 7, wherein the valve means associated with the means for supplying the plastic material is a slide valve.

9. Apparatus for producing an injection moulding of plastics material comprising means for introducing a supply of plastics material, passage means for communicating the supply means to a mould space, and means for introducing a pressurized gas into the plastics material filling the mould space whereby the gas creates a gas containing cavity in the plastics material and for thereafter relieving the gas pressure within the gas containing cavity before the mould is opened, said gas supply/pressure relieving means comprising a valve port opening directly into the mould space, a valve member for closing the port, a first passageway in said valve member for supplying pressurized gas to the mould space whilst the valve member is in a valve port closed position to create the cavity, and a non-return valve situated in an outlet end of the first passageway such that neither plastics material nor pressurized gas can pass back through the first passageway, and after a moulding operation has been finished, the supply of pressurized gas can be terminated and pressurized gas in the cavity in the moulding can be vented through a second passageway to the atmosphere due to movement of the valve member to a valve port open position, said first and second passageways converging at the valve port.

* * * * *

UNITED STATES PATENT AND TRADEMARK OFFICE
CERTIFICATE OF CORRECTION

PATENT NO. : 4,740,150
DATED : April 26, 1988
INVENTOR(S) : Matthew Emmett Sayer It is certified that error appears in the above-identified patent and that said Letters Patent is hereby corrected as shown below:

In the left column of the cover sheet under the heading "U.S. Patent Documents" and above the citation reading "4,129,635 12/1978 Yasuike et al ...264/45.5" please insert the following:

--4,101,617 7/1978 Friederich ......264/93.--

Signed and Sealed this

Twentieth Day of June, 1989

Attest:

DONALD J. QUIGG

Attesting Officer

Commissioner of Patents and Trademarks

REEXAMINATION CERTIFICATE (2637th)
United States Patent [19]

Sayer

[11] B1 4,740,150

[45] Certificate Issued   Jul. 25, 1995

[54] INJECTION MOULDING APPARATUS

[75] Inventor: Matthew E. Sayer, Tamworth, England

[73] Assignee: Peerless Cinpres Limited, Tamwor, England

Reexamination Request:
No. 90/003,620, Nov. 4, 1994

Reexamination Certificate for:
Patent No.: 4,740,150
Issued: Apr. 26, 1988
Appl. No.: 48,862
Filed: May 12, 1987

Certificate of Correction issued Jun. 20, 1989.

[30] Foreign Application Priority Data

Mar. 16, 1987 [GB] United Kingdom ............ 8706204

[51] Int. Cl.$^6$ ............................................. B29C 45/00
[52] U.S. Cl. .................................... 425/542; 264/513; 264/572; 425/557; 425/559; 425/562; 425/573

[56] References Cited

U.S. PATENT DOCUMENTS 4,101,617  7/1978  Friederich ............................ 264/93
4,380,332  6/1983  Hendry ................................. 425/4 R

FOREIGN PATENT DOCUMENTS 2139548  11/1986  United Kingdom .

*Primary Examiner*—Tim Heitbrink

[57] ABSTRACT

Apparatus for producing an injection moulding of plastics material comprises means for introducing a supply of plastics material, passage means for communicating the supply means to a mould space, and means for introducing a pressurized gas into the plastics material filling the mould space whereby the gas creates a gas containing cavity in the plastics material and for thereafter relieving the gas pressure within the gas containing cavity before the mould is opened. The gas supply/pressure relieving means comprise valve means including a valve port opening directly into the mould space, for opening the gas filled cavity to the atmosphere, a valve member for closing the port, and means to supply pressurized gas to the mould while the valve member is in the port closing position to create the cavity and to maintain the valve port open to the cavity whereby, after a moulding operation has been finished, the supply of pressurized gas can be terminated and pressurized gas in the cavity in the moulding can be vented to atmosphere by opening the valve member.

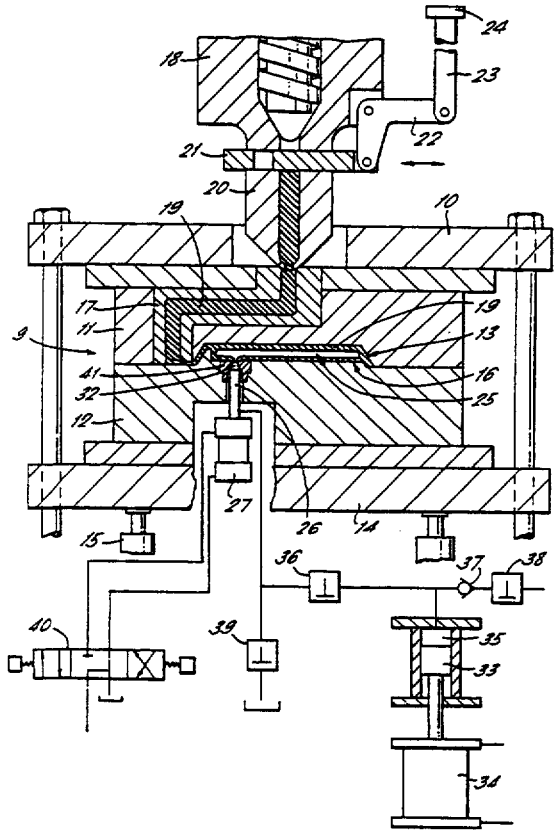

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *